Patented July 6, 1943

2,323,503

UNITED STATES PATENT OFFICE 2,323,503

METHYLENE BIS-AZOLES

Cyril D. Wilson, Metuchen, N. J., assignor, by mesne assignments, to E. I. du Pont de Nemours & Company, Wilmington, Del., a corporation of Delaware No Drawing. Application November 10, 1939, Serial No. 303,872

7 Claims. (Cl. 260—306)

This invention relates to color photography. More particularly it relates to new chemical compounds and to photographic emulsions and developer solutions containing the novel compounds as color formers. Still more particularly it relates to aforesaid compositions containing color-forming compounds which contain at least one azole radical. The invention also relates to dyes produced by the use of such color formers and to methods for producing dye images utilizing the novel color formers hereof.

This invention has for an object the provision of a new class of color formers which may be used in developer solutions and emulsions. A further object is to provide new color formers which can be economically made from readily available chemical compounds. A still further object is the production of developer solutions and emulsion layers containing color formers of good tinctorial strength and color. A still further object is the production of color formers which do not affect the sensitivity of photographic emulsions. Still other objects will be apparent from the following specification.

The above and other objects are accomplished by the preparation and use in photo-emulsions and processing solutions, especially developing solutions, of methylene bis azoles which are characterized in that two azole radicals are joined by a methylene radical at the median carbon atom. The compounds have the general formula:

(1)
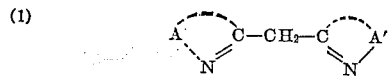

wherein A and A' constitute the atoms necessary to form an azole ring of the same or different type, e. g. an oxazole, thiazole, selenazole or tellurazole ring. The azole nuclei may be monocyclic or polycyclic. That is, they may contain carbocyclic ring systems fused onto the ring containing the hetero atoms.

In a more preferred embodiment of the invention the compounds contain two ring systems in each azole radical and may be represented by the general formula:

(2)
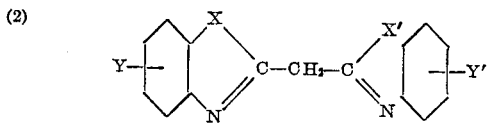

wherein X and X' may be the same or different and represent an atom from the oxygen family or chalcogen consisting of oxygen, sulfur, selenium and tellurium atoms (the term chalcogen has been adopted as a generic term to cover the elements oxygen, sulfur, selenium, and tellurium. See the Journal of the American Chemical Society, vol. 63, page 889), and Y and Y' may be the same or different and represent hydrogen, alkyl radicals of 1 to 20 carbon atoms, e. g. ethyl, methyl, dodecyl, etc., cycloalkyl, e. g. cyclohexyl, methylcyclohexyl, ethylcyclohexyl, menthyl; aryl, e. g. phenyl, naphthyl, chlorphenyl, etc., aralkyl, e. g. benzyl, methylbenzyl, menaphthyl, etc., carboxylic acyl, including aliphatic acyl, e. g. acetyl, butyroyl, lauroyl, stearoyl, caproyl, etc., heterocyclicacyl, e. g. thienoyl, nicotinoyl, isonicotinoyl, etc., cyclic acyl, e. g. benzoyl naphthoyl, etc., preferably containing at least 6 carbon atoms. The benzene nuclei of the above furthermore may have one or more water-insolubilizing groups substituted thereon, e. g. alkyl, alkoxy, e. g. methoxy, ethoxy, etc., halogen, e. g. chlorine, bromine and nitro groups or, if desired, solubilizing groups such as hydroxyl sulfonic and carboxylic acid and their salts.

In a still more preferred embodiment of the invention the compounds contain two ring systems in each azole radical which are selected from the group consisting of thiazole and oxazole radicals. Such preferred compounds have the structure of Formula 2 but X and X' are limited to oxygen or sulfur atoms. These compounds are more easily prepared, the starting materials are more readily available and the resulting dyes have better color values and stability than the remaining members falling within the generic formula.

In preparing the novel color formers hereof a malonic acid ester is reacted with two mols of an amino compound containing in an ortho position to the —NH2 group an —OH, —SH, —SeH or TeH group or one mol of each of two compounds of aforesaid type. Thus, symmetrical and unsymmetrical dyes may be prepared. The preparation of the former may be exemplified by the following equation, wherein ortho amino thiophenol is reacted with diethyl malonate:

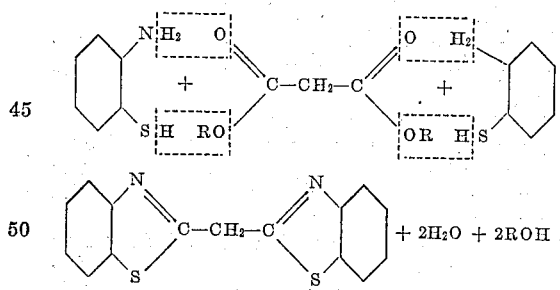

The reaction may be accomplished by dissolving or suspending the two reactants in an inert organic solvent, preferably a volatile hydrocarbon solvent such as xylene, and heating the mixture under reflux for several hours until ring closure obtains. The mixture is cooled, filtered and the product recrystallized or distilled, depending upon its nature.

The methylene bis-azoles may be incorporated in developer solutions by dissolving them in a suitable solvent and adding it to the solution with stirring. They may be added to emulsions, e. g. silver halide emulsions in a similar manner. In some cases, the use of dispersing agents such as alkylated naphthalene sulfonates, higher aliphatic fatty alcohol sulfates, higher aliphatic sulfonates, mineral oil sulfonates, Turkey red oil, etc. is advantageous.

The invention will be further illustrated but is not intended to be limited by the following examples:

*Example I*

One mol of the diethyl ester of malonic acid dissolved in xylene and two mols of o-amino thiophenol is added to the boiling mixture. The mixture is refluxed for 2 to 3 hours at a temperature of about 140° C., cooled, filtered and the resulting product purified.

*Example II*

One mol of the diethyl ester of malonic acid is dissolved in xylene and two mols of o-aminophenol are added with stirring to the boiling mixture. The reaction mixture is heated under reflux for several hours and then at a temperature of 200° C. for several hours. The solution is chilled and the crystals recrystallized.

In place of the specific amino compounds of the above examples may be substituted various other aromatic compounds containing an amino group and a reactive hydrogen atom attached to an atom from the oxygen family of elements. Thus, o-amino bromophenol, o-amino chlorophenol, o-amino bromo-thiophenl, o-amino nitrophenol, o-amino selenophenol, o-amino-tellurophenol, etc. may be substituted in similar amounts.

When an unsymmetrical compound is desired a mixture of equal parts of the amino phenols, for instance, a mol of o-aminophenol and a mol of o-aminothiophenol are reacted with an equivalent amount of the malonic acid ester. Another method of preparing the unsymmetrical compounds involves the stepwise reaction of the components. Thus, one mol of an amino phenol is reacted with one mol of the malonic ester and the resulting product reacted with one mol of a different aminophenol, e. g. an aminothiophenol or a methoxylaminophenol.

Various types of malonic acid esters may be substituted for the diethyl ester above described. Thus, the dimethyl, diisopropyl, dibutyl, dibenzoyl, etc. esters may be used. The malonyl halides, e. g. malonyl chloride, may likewise be resorted to. The ester chosen should preferably be from a volatile alcohol to facilitate the reaction.

Likewise other solvents can be used as reaction media. As examples of suitable solvents which may be substituted for the cylene of the examples are benzene, toluene, benzine, ligroin, light petroleum fractions, pyridine, etc.

The above examples which are all drawn to the preparation of the bis methylene μ-azoles include the preparation of a number of new chemical compounds. Thus, the unsymmetrical compounds and the nuclear substituted symmetrical compounds are believed to be new and have considerable utility.

The compounds or mixtures may be introduced into photographic emulsion layers or developer solutions as previously described and dyes produced therefrom by some suitable treatment such as exposure and development with a color forming developer, or treatment with a diazo compound to yield an over-all diffuse dye followed by localized bleaching of the dye in the image areas. In the case of emulsions the color-formers are dissolved in alkali or carbonate solutions. Small amounts of organic solvents, e. g. alcohol or acetone may be used.

The remaining examples are directed to the use of the compounds or mixtures of the same in various photographic compositions and to processes of developing dyed images utilizing such compounds.

*Example III*

To 100 ccs. of 2% by weight aqueous gelatin solution is added a solution consisting of 8 ccs. of ethyl alcohol and 1 gram of the compound having a melting point of 92.3° C. and being of the formula:

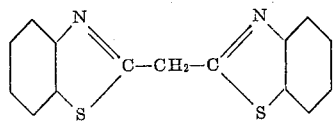

The total weight of the combined solution is then brought to about 150 grams with water and then the mixture is added to 100 grams of a gelatino-silver halide emulsion and mixed thoroughly. The resulting emulsion may then be coated upon a suitable support such as paper, glass or a cellulose derivative base, or upon another photographic emulsion layer which may or may not be another color-forming dye component. After exposure directly in a camera or by printing through appropriate color records, the film is developed in a non-color-forming developer. The reversed image is then developed by means of an alkaline solution of diethyl-p-phenylene-diamine, whereupon a red-orange dye of good strength and color forms in situ with metallic silver.

*Example IV*

To 100 ccs. of 2% by weight aqueous gelatin solution is added a solution consisting of 8 ccs. of ethyl alcohol and 1 gram of the compound having the formula:

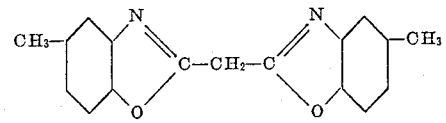

which decomposes at about 223° C. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example III. After exposure the photographic element is developed in an alkaline solution containing diethyl-p-phenylene diamine, whereupon a yellow-orange dye of good tinctorial strength is formed.

Similar results were obtained with methylene bis-nitrobenzoxazole having a melting point above 310° C. which forms an orange dye and the corresponding amino compound which gives a brick red dye. This latter compound also acts as a developer.

*Example V*

To 100 ccs. of 2% by weight aqueous gelatin solution is added a solution consisting of 8 ccs. of ethyl alcohol and 1.5 grams of the compound having the formula:

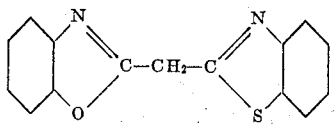

which has a melting point of about 88 to 89° C., together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example III. After exposure the photographic element is developed in an alkaline solution containing dimethyl-p-phenylene diamine, whereupon an orange dye light in color and of good tinctorial strength is formed.

*Example VI*

To 100 ccs. of 2% by weight aqueous gelatin solution consisting of 8 ccs. of ethyl alcohol and 1.5 grams of the compound having a melting point of 115° C. and being of the formula:

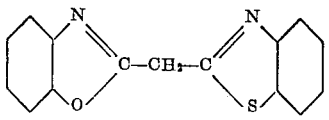

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example III. After exposure the photographic element is developed in an alkaline solution containing dimethyl-p-phenylene diamine, whereupon an orange dye light in color and of good tinctorial strength is formed.

*Example VII*

To 100 ccs. of a developer having the following composition:

Diethyl - p - phenylenediamine hydrochloride _____ g__ 2
Sodium sulfite (anhydrous) _____ g__ 5
Sodium carbonate (anhydrous) _____ g__ 20
Water _____ cc__ 1000 are added from 0.1 to 1.0 gram of methylene bis-μ-benzothiazole (compound of Example I) dissolved in a few ccs. of ethyl alcohol. An exposed photographic element containing exposed silver salts is then developed in aforesaid solution.

The color formers hereof may be used with various types of emulsions and are especially useful in the development of gelatino silver halide emulsions such as silver chloride, silver bromide, silver chloro-bromide, silver bromide-iodide, etc. emulsions. They may be used with latent images or reversed or bleached images and form dyes in situ with metallic silver. Upon removal of the silver transparent dye images are left.

The dye intermediates used in this invention are not limited in their utility to any one process of color photography. They are suitable for dye coupling development with p-phenylenediamine derivatives, and by suitably controlling the molecular weights of the products, they may be used in the color developer or in the photographic emulsion. Furthermore, the dye components of this invention couple with diazo compounds, e. g. tetrazotized dianisidine, so that they are therefore suitable for transforming into azo dyes, followed or not by differential bleaching in the presence of silver images as is known in the art. They may be used in multilayer or single layer films.

The preferred developing agents in the process of dye coupling development are derivatives of p-phenylenediamine and particularly the asymmetric dialkyl p - phenylenediamines, e. g. p-aminodimethylaniline, p-aminodiethylaniline, p-aminodibutylaniline, etc. Other developing agents which may be used include p-phenylenediamine itself, p-methylaminoaniline, p-ethylaminoaniline, p-aminophenol, N,N-diethyl-o-phenylenediamine, chloro-p-phenylenediamine, 1,2,5-toluylenediamine, 2-amino-5-diethylaminotoluene, N-p-aminophenylpiperidine, N-methyl-N-hydroxy-ethyl-p-phenylene diamine, N-butyl-N-hydroxyethyl-p-phenylene-diamine, β-γ-dihydroxypropyl - p - phenylenediamine, 2-amino-5-(N-β-hydroxy-ethyl-N-butyl) aminotoluene and its dihydrochloride, etc. These aromatic amino-developing agents may be used in the form of their salts, which may be either inorganic or organic. The salts are in general more stable than the free bases. As examples of suitable salts mention is made of the hydrochloride, sulfates, acetates, etc.

As many apparently widely different embodiments of this invention may be made without departing from the spirit and scope thereof, it is to be understood that I do not limit myself to the specific embodiments hereof except as defined by the appended claims.

I claim:

1. As new chemical compounds the unsymmetrical methylene bis-μ-azoles containing a single hetero-nitrogen atom having a double bond attached thereto.

2. The new chemical compounds of the general formula:

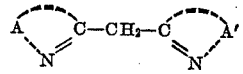

wherein A constitutes the atoms necessary to form an azole ring having a single hetero-nitrogen atom having a double bond attached thereto and A' constitutes the atoms necessary to form an azole radical different from A.

3. The chemical compounds of the general formula:

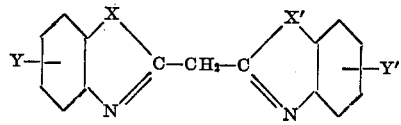

wherein X and X' represent different chalcogens and Y and Y' are members taken from the class consisting of hydrogen alkyl, aryl, aralkyl, acyl halogen, nitro and amino radicals.

4. The process which comprises reacting one mol of an aromatic primary amino compound of the general formula:

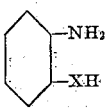

wherein X is a chalcogen with a reactive malonic acid compound, reacting the resulting compound with a different amino compound having said formula and recovering a bis-methylene-$\mu$-azole.

5. The process which comprises reacting one mol of a substituted aromatic primary amino compound of the general formula:

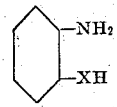

wherein X is a chalcogen with a reactive malonic acid compound, reacting the resulting compound with a different amino compound having said formula and recovering a bis-methylene-$\mu$-azole.

6. The process which comprises reacting one mol of a substituted aromatic primary amino compound of the general formula:

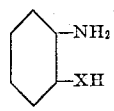

wherein X is a chalcogen with a malonic acid diester, reacting the resulting compound with a different amino compound having said formula, and recovering a bis-methylene-$\mu$-azole.

7. The process which comprises reacting one mol of a substituted aromatic primary amino compound of the general formula:

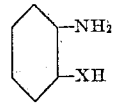

wherein X is a chalcogen with a malonic acid diester with a volatile monohydric alcohol, reacting the resulting compound with a different amino compound of said formula, and recovering a bis-methylene-$\mu$-azole.

CYRIL D. WILSON.